(12) United States Patent
Yang (10) Patent No.: US 10,423,585 B2
(45) Date of Patent: Sep. 24, 2019

(54) METHOD AND DEVICE FOR MAKING DIFFERENTIAL UPGRADE PACKAGE, AND METHOD AND DEVICE FOR SYSTEM DIFFERENTIAL UPGRADING

(71) Applicant: ZTE Corporation, Shenzhen (CN)

(72) Inventor: Siliang Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 199 days.

(21) Appl. No.: 15/102,780

(22) PCT Filed: May 22, 2014

(86) PCT No.: PCT/CN2014/078183
§ 371 (c)(1),
(2) Date: Jun. 8, 2016

(87) PCT Pub. No.: WO2014/180388
PCT Pub. Date: Nov. 13, 2014

(65) Prior Publication Data
US 2016/0321063 A1   Nov. 3, 2016

(30) Foreign Application Priority Data
Dec. 13, 2013 (CN) .......................... 2013 1 0684083

(51) Int. Cl.
*G06F 9/445* (2018.01)
*G06F 9/44* (2018.01)
(Continued)

(52) U.S. Cl.
CPC ............ *G06F 16/178* (2019.01); *G06F 8/658* (2018.02); *G06F 11/1433* (2013.01); *G06F 11/1458* (2013.01); *G06F 2201/84* (2013.01)

(58) Field of Classification Search
CPC ............ G06F 11/1433; G06F 11/1458; G06F 11/1417; G06F 8/68; G06F 17/30174;
(Continued)

(56) References Cited

U.S. PATENT DOCUMENTS 7,953,945 B2 * 5/2011 Bender ............... G06F 11/1435
  711/161
8,458,142 B2 * 6/2013 Pace .......................... G06F 8/60
  707/690
(Continued)

FOREIGN PATENT DOCUMENTS

CN    102662700 A    9/2012
CN    102880495 A    1/2013
(Continued)

OTHER PUBLICATIONS

Vallejos et al., Towards resilient partitioning of pervasive computing services, 6 pages (Year: 2008).*
(Continued)

*Primary Examiner* — Thuy Dao
(74) *Attorney, Agent, or Firm* — Cantor Colburn LLP (57) ABSTRACT

The embodiments of disclosure disclose a method for differential upgrading of a variable-partition system, which includes the following steps that: partition information is acquired from a differential upgrade package; data backup is performed to data of old partitions; partition re-division is performed on the old partitions to obtain new partitions according to the partition information, and the new partitions are formatted; the backed-up data is recovered into the new partitions; and differential upgrading is performed of the variable-partition system by virtue of the differential upgrade package. The embodiments of the disclosure also disclose a device for differential upgrading of the variable-partition system. The embodiments of the disclosure further disclose a method for making a differential upgrade package
(Continued)

with partition information. The embodiments of the disclosure further disclose a device for making a differential upgrade package with partition information. By the embodiments of the disclosure, the problem in the related art that differential upgrading cannot be implemented when partition information of a target version and the partition information of an original version are varied is effectively solved.

14 Claims, 4 Drawing Sheets

(51) Int. Cl.
*H04L 29/08* (2006.01)
*G06F 9/455* (2018.01)
*G06F 16/178* (2019.01)
*G06F 11/14* (2006.01)
*G06F 8/658* (2018.01)

(58) Field of Classification Search
CPC ......... G06F 17/30592; G06F 17/30339; G06F 17/30545; G06F 8/65; G06F 8/658; G06F 8/64; G06F 9/5088; G06F 2009/4557; G06F 2009/5011; G06F 16/178; B65D 5/48018; B65D 5/5023; B65D 5/5213; B65D 5/6602; H04L 67/10

See application file for complete search history.

(56) References Cited

U.S. PATENT DOCUMENTS

| | | | | |
|---|---|---|---|---|
| 8,539,471 | B2* | 9/2013 | Morton | G06F 8/654 717/168 |
| 8,650,226 | B2* | 2/2014 | Bobick | G06F 8/60 707/807 |
| 8,869,138 | B2* | 10/2014 | Bandakka | G06F 11/1417 717/174 |
| 2003/0220944 | A1* | 11/2003 | Lyman Schottland | G06F 8/658 |
| 2005/0132179 | A1* | 6/2005 | Glaum | G06F 8/68 713/1 |
| 2014/0059313 | A1* | 2/2014 | Hwang | G06F 11/1435 711/162 |
| 2014/0164409 | A1* | 6/2014 | Johnson | G06F 17/30501 707/756 |
| 2014/0214767 | A1* | 7/2014 | Graefe | G06F 17/30575 707/645 |

FOREIGN PATENT DOCUMENTS

| | | | |
|---|---|---|---|
| JP | 2006293512 | A | 10/2006 |
| JP | 2011095952 | A | 5/2011 |
| JP | 2012234563 | A | 11/2012 |
| WO | 2010052647 | A1 | 5/2010 |

OTHER PUBLICATIONS

Di Cosmo et al., Package upgrades in FOSS distributions: details and challenges, 5 pages (Year: 2008).*
International Search Report for corresponding application PCT/CN20141078183 filed on May 22, 2014; dated Sep. 16, 2014.

* cited by examiner

METHOD AND DEVICE FOR MAKING DIFFERENTIAL UPGRADE PACKAGE, AND METHOD AND DEVICE FOR SYSTEM DIFFERENTIAL UPGRADING

TECHNICAL FIELD

The disclosure relates to the mobile communications field, and in particular to a method and device for making a differential upgrade package and a method and device for system differential upgrading.

BACKGROUND

Along with continuous popularization of intelligent systems of mobile terminals, periods for terminal device manufacturers and operating companies to launch new functions and new services become shorter and shorter, and meanwhile, more and more complicated system software versions are provided, and many unknown problems continuously arise in using processes of users. In order to solve these problems and bring better user experiences to the users, the terminal device manufacturers and the operating companies usually adopt an Over The Air (OTA) manner for version upgrading of the users.

A wireless network is adopted for the OTA manner, and characteristics of small bandwidth, poor network stability and the like of the wireless network determine that transmission of an oversized file should be avoided when the OTA manner is adopted for file transmission. In order to reduce network transmission traffic of the OTA upgrading manner, an OTA upgrade package usually adopts at least one differential upgrade package, and such an upgrading technology is called a differential upgrading technology. In upgrading of an Android system, a differential upgrading technology currently used in the industry may implement system version upgrading in a case that terminal system partitions are not varied.

Figure 1:
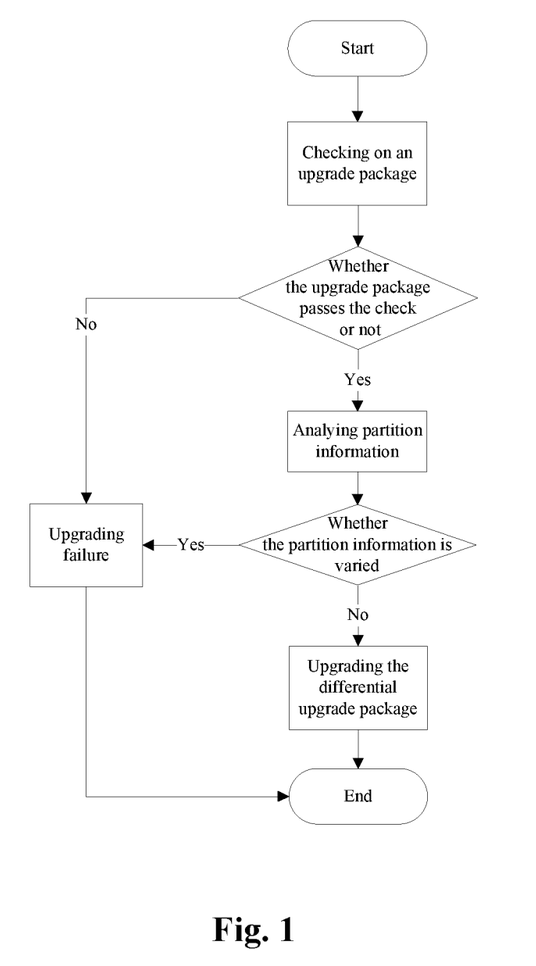
FIG. 1 is a flowchart of a method for system differential upgrading according to the related art.

Along with new system software optimization and new application addition or upgrading, original partitions of a terminal system may not meet a requirement of a current system running environment, and the system is required to be repartitioned according to a new requirement. A method for system differential upgrading in the related art is shown in FIG. 1, and after an upgrade package passes verification, it is judged whether or not partition information of a target version and partition information of an original version are varied, differential upgrading is performed when the partition information is not varied, and an upgrading failure is prompted to a user when the partition information is varied.

Therefore, when partitions of a system are varied, system upgrading may not be implemented by a differential upgrading technology, and the upgrading may be implemented only in a full-version manner. A full-version upgrade package is usually large, and if the OTA manner is adopted for upgrading of a user, a bandwidth of the wireless network may be greatly limited for the moment, which may cause a heavy network load and poor user experiences in downloading time of the upgrade package, network stability and the like.

SUMMARY

The technical problem to be solved by the embodiments of the disclosure is to provide a method and device for making a differential upgrade package and a method and device for system differential upgrading, so as to solve the problem in the related art that differential upgrading cannot be implemented when partition information of a target version and the partition information of an original version are varied.

In order to solve the above-mentioned technical problem, one embodiment of the disclosure provides a method for making a differential upgrade package with partition information, which may include the following step that: making the differential upgrade package according to an original version of a system to be upgraded and a target version of the system to be upgraded, wherein the differential upgrade package includes the partition information.

In an example embodiment, the partition information includes partition condition information of the target version or partition variation information of the target version relative to the original version.

In an example embodiment, the differential upgrade package further includes information of a specified file to be deleted.

Another embodiment of the disclosure further provides a device for making a differential upgrade package with partition information, which may include:

an original version storage element, configured to store an original version of a system to be upgraded; a target version storage element, configured to store a target version of the system to be upgraded; and an upgrade package making element, configured to make the differential upgrade package according to the original version, stored in the original version storage element, of the system to be upgraded and the target version, stored in the target version storage element, of the system to be upgraded, wherein the differential upgrade package includes the partition information.

In an example embodiment, the partition information includes partition condition information of the target version or partition variation information of the target version relative to the original version.

In an example embodiment, the differential upgrade package further includes information of a specified file to be deleted.

Another embodiment of the disclosure further provides a method for differential upgrading of a variable-partition system, which may include the following steps that:

acquiring partition information from a differential upgrade package; performing data backup on data of old partitions; performing partition re-division on the old partitions to obtain new partitions according to the partition information, and formatting the new partitions; recovering the backed-up data into the new partitions; and performing differential upgrading of the variable-partition system by virtue of the differential upgrade package.

In an example embodiment, before acquiring the partition information from the differential upgrade package, further including: performing security check on the differential upgrade package, wherein after the differential upgrade package passes the security check, entering a process of acquiring the partition information.

In an example embodiment, in a process of acquiring the partition information from the differential upgrade package, when the partition information is partition condition information of a target version, a partition table in an original version is compared with a partition condition of the target version to obtain partition variation information of the target version relative to the original version.

In an example embodiment, during performing data backup to the old partition data, the data backup is only performed on varied data of the old partitions.

In an example embodiment, data backup of the data of the old partitions includes backup of a partition file.

In an example embodiment, during performing data backup to the data of the old partitions, the data backup is performed in a manner of replicating all the data in the partitions.

In an example embodiment, during performing data backup to the data of the old partitions, compression processing is performed on the backed-up data.

In an example embodiment, in a data backup process of the data of the old partitions, the method further includes: checking the backed-up data after data backup.

In an example embodiment, during performing data backup to the data of the old partitions, when a continuance allowing failure occurs, the process of acquiring the partition information from the differential upgrade package is re-executed after next startup; and when a continuance forbidding failure occurs, an upgrading failure is prompted to a user.

In an example embodiment, in the data backup process of the data of the old partitions, external storage device is adopted to store the backed-up data.

In an example embodiment, in a partition re-division or formatting process, when a continuance allowing failure occurs, the process of acquiring the partition information from the differential upgrade package is re-executed after next startup; and when a continuance forbidding failure occurs, an original system is recovered according to the backed-up data.

In an example embodiment, in a process of recovering the backed-up data into the new partitions, when a continuance allowing failure occurs, the process of acquiring the partition information from the differential upgrade package is re-executed after next startup; and when a continuance forbidding failure occurs, the original system is recovered according to the backed-up data.

In an example embodiment, the further includes: in a process of acquiring the partition information from the differential upgrade package, judging whether all the data to be backed up of the old partitions are able to be loaded into the new partitions or not; during performing data backup to the data of the old partitions, when not all the data to be backed up of the old partitions are able to be loaded into the new partitions, acquiring information of a specified file to be deleted from the differential upgrade package, and during backup, not backing up the specified file to be deleted indicated in the differential upgrade package; and during performing the differential upgrading of the variable-partition system, removing data of the specified file to be deleted.

In an example embodiment, the method further includes: in a process of acquiring the partition information from the differential upgrade package, judging whether all the data to be backed up of the old partitions are able to be loaded into the new partitions or not; during performing data backup to the data of the old partitions, when not all the data of the to be backed up old partitions are able to be loaded into the new partitions, completely backing up the data to be backed up of the old partitions; and in a process of recovering the backed-up data into the new partitions, performing the differential upgrading of the variable-partition system by virtue of the differential upgrade package.

Another embodiment of the disclosure further provides a device for differential upgrading of a variable-partition system, which may include:

a partition information acquisition element, configured to acquire partition information from a differential upgrade package; a data backup element, configured to perform data backup to data of old partitions; a partition division element, configured to perform partition re-division on the old partitions to obtain new partitions according to the partition information, and format the new partitions; a data recovery element, configured to recover the backed-up data into the new partitions; and a differential upgrading element, configured to perform differential upgrading of the variable-partition system by virtue of the differential upgrade package.

In an example embodiment, the data backup element includes: a data replication subelement, which is configured to perform data backup in a manner of replicating all the data in the old partitions.

In an example embodiment, the data backup element further includes: a data compression subelement, which is configured to perform compression processing to the backed-up data.

In an example embodiment, the data backup element further includes: a data check subelement, which is configured to check the backed-up data after data backup.

In an example embodiment, the data backup element further includes: external storage device, which is configured to store the backed-up data.

In an example embodiment, the device further includes: a security check element, which is configured to perform security check on the differential upgrade package.

The embodiments of the disclosure have beneficial effects as follows:

according to the embodiments of the disclosure, the problem that the differential upgrading cannot be implemented when the partition information of the target version and the partition information of the original version are varied may be effectively solved; the target version and the original version are compared to generate the differential upgrade package with the partition information, and system processing, namely system partition division and upgrading are implemented according to the partition information during upgrading; and moreover, the backup and recovery processes of original system data are introduced in the disclosure, and the condition of original data incompatibility caused by partition variations in the backup or recovery process is processed to solve the problem in the related art that the differential upgrading cannot be implemented in the case of processing varied partitions, so that a size of the upgrade package is effectively reduced, a requirement of OTA on network performance is greatly lowered, and a user experience is improved.

DETAILED DESCRIPTION

In order to solve the problem in the related art that differential upgrading cannot be implemented when partition information of a target version and partition information of an original version are varied, the embodiments of disclosure provide a method and device for making a differential upgrade package and a method and device for system differential upgrading, and the disclosure will be further described below with reference to the drawings and six embodiments in detail. It should be understood that the specific embodiments described here are only adopted to explain the disclosure and not intended to limit the disclosure.

Embodiment 1

Figure 2:
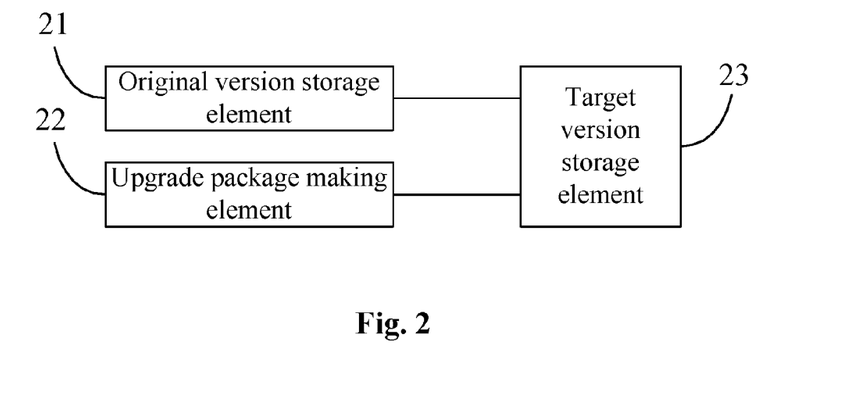
FIG. 2 is a structural diagram of a device for making a differential upgrade package with partition information according to an embodiment of the disclosure.

A device for making a differential upgrade package with partition information in an embodiment of the disclosure, as shown in FIG. 2, includes an original version storage element 21, a target version storage element 22 and an upgrade package making element 23, wherein the upgrade package making element 23 is respectively connected with the original version storage element 21 and the target version storage element 22.

The original version storage element 21 is configured to store an original version of a system to be upgraded; the target version storage element 22 is configured to store a target version of the system to be upgraded; and the upgrade package making element 23 is configured to make the differential upgrade package according to the original version, stored in the original version storage element 21, of the system to be upgraded and the target version, stored in the target version storage element 22, of the system to be upgraded. The differential upgrade package contains the partition information and information of a specified file to be deleted, and the partition information includes partition condition information of the target version or partition variation information of the target version relative to the original version.

Embodiment 2

When the device for making the differential upgrade package with the partition information in embodiment 1 is adopted, a method for making the differential upgrade package with partition information in the embodiment of the disclosure includes the following steps that: the differential upgrade package is made according to an original version of a system to be upgraded and a target version of the system to be upgraded, wherein the differential upgrade package contains the partition information and information of a specified file to be deleted, wherein the partition information includes partition condition information of the target version or partition variation information of the target version relative to the original version.

Embodiment 3

Figure 3:
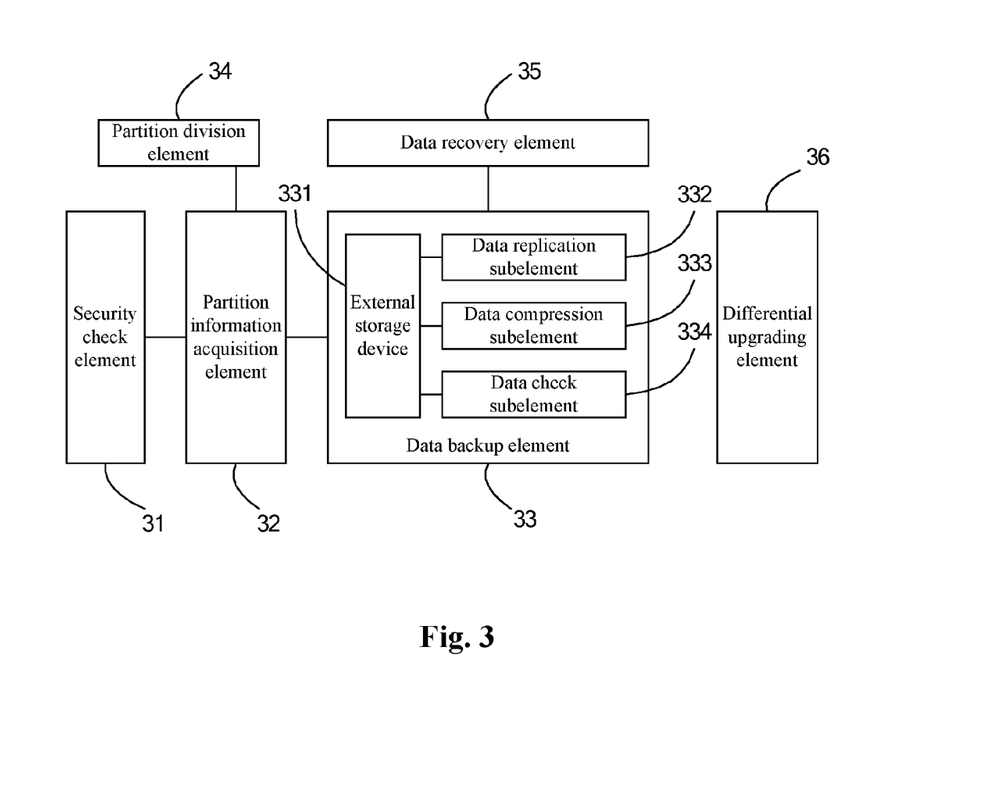
FIG. 3 is a structural diagram of a device for differential upgrading of a variable-partition system according to an embodiment of the disclosure.

A device for differential upgrading of a variable-partition system in the embodiment of the disclosure, as shown in FIG. 3, includes a security check element 31, a partition information acquisition element 32, a data backup element 33, a partition division element 34, a data recovery element 35 and a differential upgrading element 36, wherein the partition information acquisition element 32 is respectively connected with the security check element 31, the data backup element 33 and the partition division element 34; and the data recovery element 35 is connected with the data backup element 33.

The security check element 31 is configured to perform security check on a differential upgrade package; the partition information acquisition element 32 is configured to acquire partition information from the differential upgrade package, implement analysis to a partition variation and determine a varied partition and a variation value of the varied partition; the data backup element 33 is configured to perform data backup on data of old partitions; the partition division element 34 is configured to perform partition re-division on the old partitions to obtain new partitions according to the partition information, and format the new partitions; the data recovery element 35 is configured to recover the backed-up data into the new partitions; and the differential upgrading element 36 is configured to perform system differential upgrading according to the differential upgrade package.

The data backup element 33 includes a external storage device 331, a data replication subelement 332, a data compression subelement 333 and a data check subelement 334, wherein the external storage device 331 is respectively connected with the data replication subelement 332, the data compression subelement 333 and the data check subelement 334.

The external storage device 331 is configured to store the backed-up data; the data replication subelement 332 is configured to perform data backup in a manner of replicating all the data in the old partitions; the data compression subelement 333 is configured to perform compression processing on the backed-up data; and the data check subelement 334 is configured to check the backed-up data after completing data backup.

Embodiment 4

Figure 4:
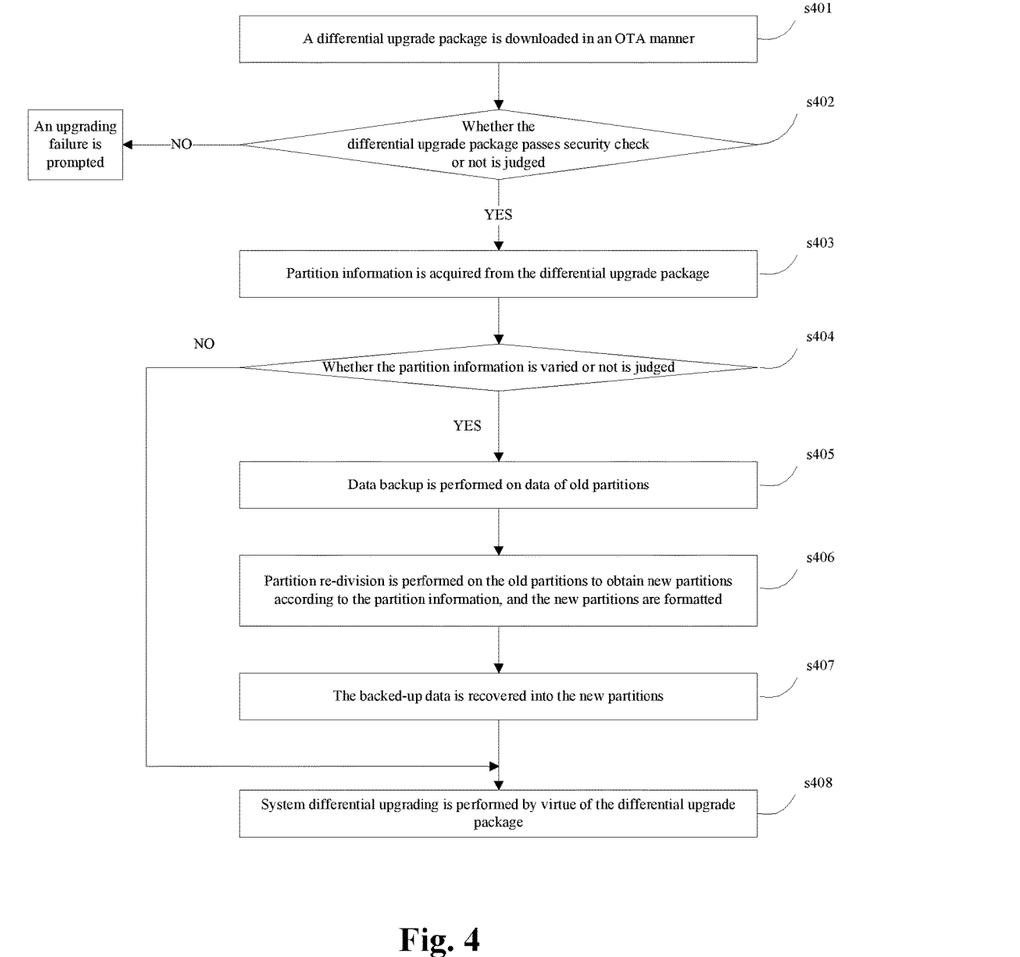
FIG. 4 is a flowchart of a method for differential upgrading of a variable-partition system according to an embodiment of the disclosure.

When device for the differential upgrading of a variable-partition system in embodiment 3 is adopted, a method for differential upgrading of a variable-partition system of an embodiment of the disclosure, as shown in FIG. 4, includes the following steps.

Step 401: a differential upgrade package is downloaded in an OTA manner, the differential upgrade package containing partition information.

Step 402: security check is performed on the differential upgrade package to verify whether the differential upgrade package is matched and tampered or not; whether the differential upgrade package passes the security check or not is judged, Step 403 is executed if the differential upgrade package passes the security check, otherwise an upgrading failure is prompted.

Step 403: partition information is acquired from the differential upgrade package, wherein the partition information includes partition condition information of a target version or partition variation information of the target version relative to the original version, and in the embodiment, when the partition information is the partition condition information of the target version, a partition table in the original version is compared with a partition condition of the target version to obtain the partition variation information of the target version relative to the original version.

Step 404: whether the partition information is varied or not is judged, Step 405 is executed if the partition information is varied, otherwise Step 408 is executed.

Step 405: data backup is performed on data of old partitions, wherein, in the embodiment, during performing data backup to the data of old partitions, not all the data is backed up, and data backup is only performed on varied data of old partitions, so that a space and time required by backup may be effectively reduced; moreover, except the varied data of old partitions, partition files are also required to be backed up for recovery in case of abnormity; and in the embodiment, data backup is performed in a manner of replicating all the data in old partitions, compression processing may be performed on the backed-up data to reduce an occupied space, and the backed-up data may be checked after data backup to avoid a backup error.

During performing data backup to the data of the old partitions, if a failure caused by an abnormity occurs, whether to continue performing the data backup or not may be confirmed according to a specific failure reason, and when a continuance allowing failure such as a power failure occurs, Step 403 is re-executed after next startup; and when a continuance forbidding failure occurs, an upgrading failure is prompted to a user.

In a data backup process of the data of the old partitions, the external storage device is adopted to store the backed-up data, so that occupation to an original system space is avoided, and influence of partition re-division on the backed-up data may also be avoided.

Step 406: partition re-division is performed on the old partitions to obtain new partitions according to the partition information, and the new partitions are formatted, wherein a specific implementation method may be selected according to a practical condition of a system; in a partition re-division or formatting process, if a failure caused by an abnormity occurs, whether continuance is allowed or not may be confirmed according to a specific failure reason; and in the partition re-division or formatting process, when a continuance allowing failure such as a power failure occurs, Step 403 is re-executed after next startup, and when a continuance forbidding failure occurs, an original system is recovered according to the backed-up data.

Step 407: the backed-up data is recovered into the new partitions, wherein, if a failure caused by an abnormity occurs in a data recovery process, whether continuance is allowed or not may be confirmed according to a specific failure reason; and in the process of recovering the backed-up data into the new partitions, when a continuance allowing failure such as a power failure occurs, Step 403 is re-executed after next startup, and when a continuance forbidding failure occurs, the original system is recovered according to the backed-up data.

Step 408: system differential upgrading is performed by virtue of the differential upgrade package, wherein the process may be performed according to an existing method, and a varied file is written into the system, thereby implementing upgrading.

Embodiment 5

Figure 5:
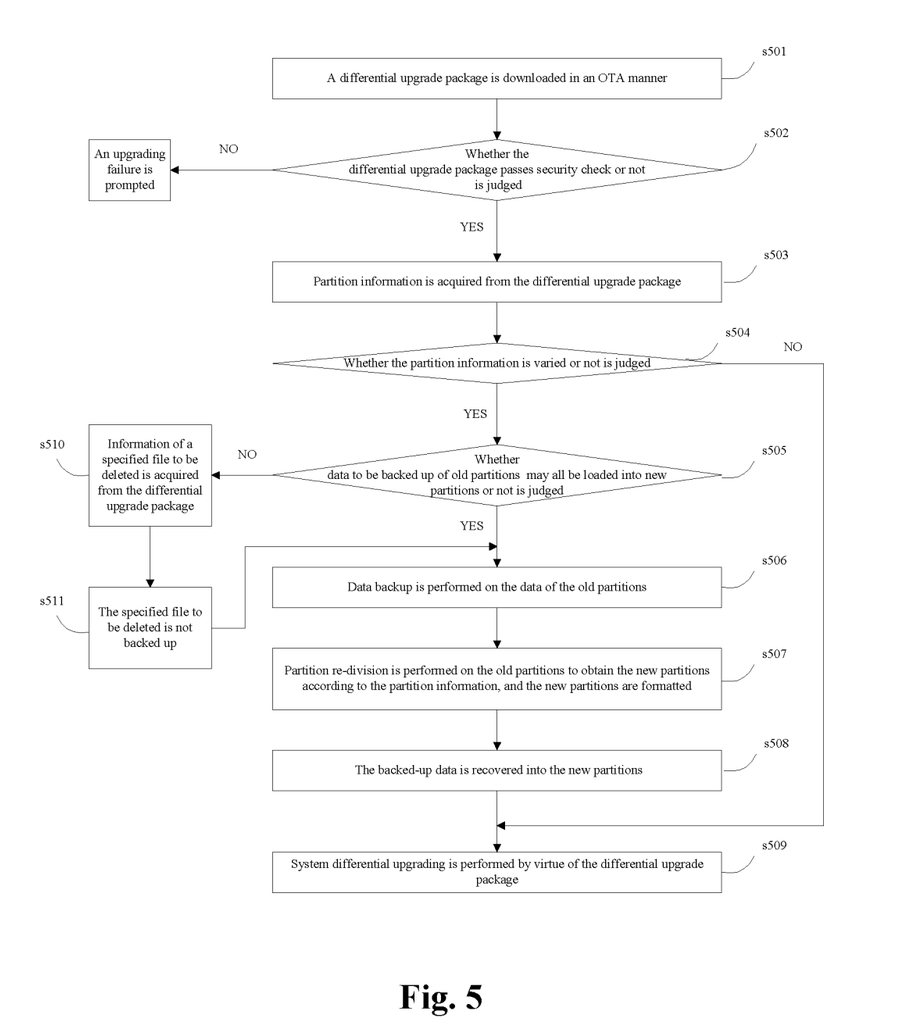
FIG. 5 is a flowchart of a method for differential upgrading of a variable-partition system according to another embodiment of the disclosure.

A method for differential upgrading of a variable-partition system of the embodiment of the disclosure, as shown in FIG. 5, is similar to the method of embodiment 4, and a main difference between the method of the embodiment and the method of embodiment 4 is that:

after the partition information is acquired from the differential upgrade package and it is determined that the partition information has been varied, Step 505 is added: whether the data to be backed of the old partitions up may all be loaded into the new partitions or not is judged, Step 506 is executed for data backup if the data to be backed up of the old partitions may all be loaded into the new partitions, otherwise Step 510 is executed.

Step 510: information of a specified file to be deleted is acquired from the differential upgrade package.

Step 511: the specified file to be deleted in the differential upgrade package is not backed up, and Step 506 is executed for data backup, wherein only data of files not to be deleted is backed up.

By the above-mentioned steps, a recovery failure condition caused by insufficient space during data recovery may be avoided.

Moreover, the specified file to be deleted in the differential upgrade package has been operated in the backup process, so that data of the specified file to be deleted is required to be removed in a system differential upgrading process.

Embodiment 6

The embodiment discloses a method for differential upgrading of a variable-partition system, the method is similar to the method of embodiment 5, and whether the data to be backed up of the old partitions may all be loaded into the new partitions or not is also judged in a process of acquiring the partition information from the differential upgrade package. A main difference between the method of the embodiment and the method of embodiment 5 is that:

under the condition that not all the data to be backed up of the old partitions may be loaded into the new partitions, the data to be backed up of the old partitions is completely backed up in the data backup process of the data of the old partitions; and in the process of recovering the backed-up data into the new partitions, system differential upgrading is performed by virtue of the differential upgrade package, that is, data recovery and differential upgrade package installation are simultaneously performed.

By the disclosure, a problem that the differential upgrading cannot be implemented when the partition information of the target version and the partition information of the original version are varied may be effectively solved; the target version and the original version are compared to generate the differential upgrade package with the partition information, and system processing, namely system partition division and upgrading are implemented according to the partition information during upgrading; and moreover, the backup and recovery processes of original system data are introduced in the disclosure, and the condition of original data incompatibility caused by partition variations in the backup or recovery process is processed to solve the problem in the related art that the differential upgrading cannot be implemented in the case of processing varied partitions, so that a size of the upgrade package is effectively reduced, a requirement of OTA on network performance is greatly lowered, and a user experience is improved.

INDUSTRIAL APPLICABILITY

According to the embodiments of the disclosure, the problem, that differential upgrading cannot be implemented when the partition information of the target version and the partition information of the original version are varied, may be effectively solved; the target version and the original version are compared to generate the differential upgrade package with the partition information, and system processing, namely system partition division and upgrading are implemented according to the partition information during upgrading; and moreover, the backup and recovery processes of original system data are introduced in the disclosure, and the condition of original data incompatibility caused by partition variations in the backup or recovery process is processed to solve the problem in the related art that the differential upgrading cannot be implemented in the case of processing varied partitions, so that a size of the upgrade package is effectively reduced, a requirement of OTA on network performance is greatly lowered, and a user experience is improved.

Although the example embodiments of the disclosure have been exemplarily disclosed, those skilled in the art should be aware that various improvements, additions and replacements are also possible, so that the scope of the disclosure should not be limited to the abovementioned embodiments.

What is claimed is:

1. A method for differential upgrading of a variable-partition system, the method comprising:
   acquiring partition information from a differential upgrade package;
   performing data backup on data of old partitions;
   performing partition re-division on the old partitions to obtain new partitions according to the partition information, and formatting the new partitions;
   recovering the backed-up data into the new partitions; and
   performing differential upgrading of the variable-partition system by virtue of the differential upgrade package,
   wherein the partition information comprises partition condition information of the target version or partition variation information of the target version relative to the original version.

2. The method for differential upgrading of the variable-partition system as claimed in claim 1, before acquiring the partition information from the differential upgrade package, further comprising: performing security check on the differential upgrade package, wherein after the differential upgrade package passes the security check, entering a process of acquiring the partition information.

3. The method for differential upgrading of the variable-partition system as claimed in claim 1, wherein in a process of acquiring the partition information from the differential upgrade package, when the partition information is partition condition information of a target version, a partition table in an original version is compared with a partition condition of the target version to obtain partition variation information of the target version relative to the original version.

4. The method for differential upgrading of the variable-partition system as claimed in claim 1, wherein during performing data backup to the old partition data, the data backup is only performed on varied data of the old partitions; or
   during performing data backup to the data of the old partitions, the data backup is performed in a manner of replicating all the data in the partitions.

5. The method for differential upgrading of the variable-partition system as claimed in claim 4, wherein data backup of the data of the old partitions comprises backup of a partition file.

6. The method for differential upgrading of the variable-partition system as claimed in claim 1, wherein during performing data backup to the data of the old partitions, compression processing is performed on the backed-up data; or
   in a data backup process of the data of the old partitions, the method further comprises: checking the backed-up data after data backup.

7. The method for differential upgrading of the variable-partition system as claimed in claim 1, wherein during performing data backup to the data of the old partitions, when a continuance allowing failure occurs, the process of acquiring the partition information from the differential upgrade package is re-executed after next startup; and when a continuance forbidding failure occurs, an upgrading failure is prompted to a user; or
   in the data backup process of the data of the old partitions, external storage device is adopted to store the backed-up data; or
   in a partition re-division or formatting process, when a continuance allowing failure occurs, the process of acquiring the partition information from the differential upgrade package is re-executed after next startup; and when a continuance forbidding failure occurs, an original system is recovered according to the backed-up data; or
   in a process of recovering the backed-up data into the new partitions, when a continuance allowing failure occurs, the process of acquiring the partition information from the differential upgrade package is re-executed after next startup; and when a continuance forbidding failure occurs, the original system is recovered according to the backed-up data.

8. The method for differential upgrading of the variable-partition system as claimed in claim 1, further comprising:
   in a process of acquiring the partition information from the differential upgrade package, judging whether all the data to be backed up of the old partitions are able to be loaded into the new partitions or not;
   during performing data backup to the data of the old partitions, when not all the data to be backed up of the old partitions are able to be loaded into the new partitions, acquiring information of a specified file to be deleted from the differential upgrade package, and during backup, not backing up the specified file to be deleted indicated in the differential upgrade package; and
   during performing the differential upgrading of the variable-partition system, removing data of the specified file to be deleted.

9. The method for differential upgrading of the variable-partition system as claimed in claim 1, further comprising:
   in a process of acquiring the partition information from the differential upgrade package, judging whether all the data to be backed up of the old partitions are able to be loaded into the new partitions or not;
   during performing data backup to the data of the old partitions, when not all the data of the to be backed up old partitions are able to be loaded into the new partitions, completely backing up the data to be backed up of the old partitions; and
   in a process of recovering the backed-up data into the new partitions, performing the differential upgrading of the variable-partition system by virtue of the differential upgrade package.

10. A device for differential upgrading of a variable-partition system, the device comprising:
    a partition information acquisition element, configured to acquire partition information from a differential upgrade package;
    a data backup element, configured to perform data backup to data of old partitions;
    a partition division element, configured to perform partition re-division on the old partitions to obtain new partitions according to the partition information, and format the new partitions;
    a data recovery element, configured to recover the backed-up data into the new partitions; and a differential upgrading element, configured to perform differential upgrading of the variable-partition system by virtue of the differential upgrade package, wherein the partition information comprises partition condition information of the target version or partition variation information of the target version relative to the original version.

11. The device for differential upgrading of the variable-partition system as claimed in claim 10, wherein the data backup element comprises: a data replication subelement, which is configured to perform data backup in a manner of replicating all the data in the old partitions.

12. The device for differential upgrading of the variable-partition system as claimed in claim 11, wherein the data backup element further comprises: a data compression subelement, which is configured to perform compression processing to the backed-up data; or the data backup element further comprises: a data check subelement, which is configured to check the backed-up data after data backup.

13. The device for differential upgrading of the variable-partition system as claimed in claim 10, wherein the data backup element further comprises: external storage device, which is configured to store the backed-up data.

14. The device for differential upgrading of the variable-partition system as claimed in claim 10, further comprising: a security check element, which is configured to perform security check on the differential upgrade package.

* * * * *